INVENTORS.
LOUIS J. PRENNER
MILTON PRENNER
ANDREW B. MARELLO
GEORGE I. KLEGER

BY *James N. Gles*
ATTORNEY

United States Patent Office 3,369,822
Patented Feb. 20, 1968

3,369,822
WHEEL MOUNT FOR AGRICULTURAL
MACHINES
Louis J. Prenner, Milton Prenner, Andrew B. Marello, and George I. Kleger, all of P. O. Box 1446, Pompano Beach, Fla. 33061
Filed Jan. 3, 1966, Ser. No. 528,326
4 Claims. (Cl. 280—80)

ABSTRACT OF THE DISCLOSURE

Wheel mounting for agricultural machines to permit the wheels to be maintained in furrows. The nonrotatable axle or shaft which carries a wheel is mounted for lateral sliding movement in auxiliary frame members of the agricultural machine.

Figure 1:
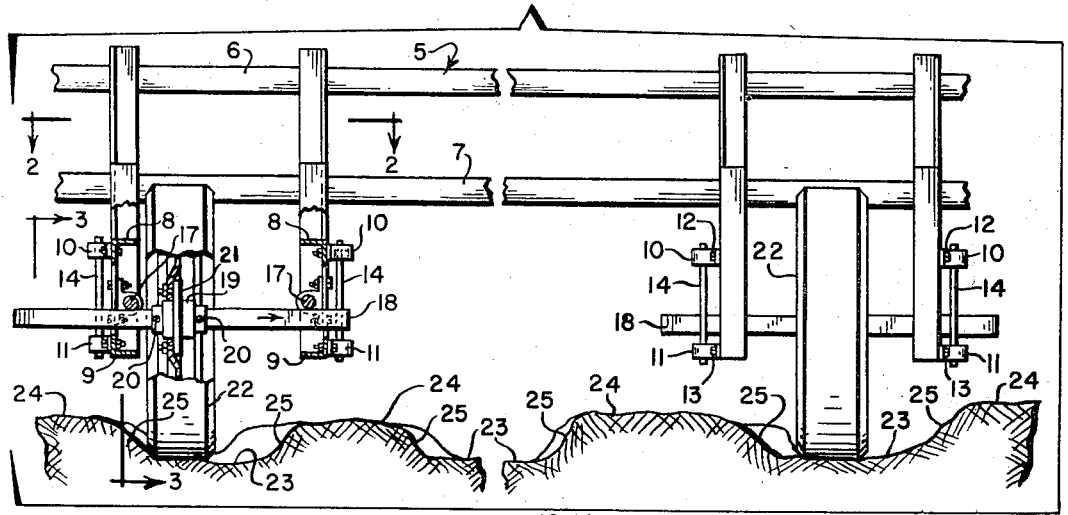

This invention relates to a wheel mount for agricultural machines such for instance as cucumber harvesting machines.

In fields wherein the various vegetables are grown, there is usually a multiplicity of furrows and with the vegetables being grown upon the tops of the furrows, defining a valley therebetween into which the wheels of the machine travel and usually, at least two wheels traverse the valley between a multiplicity of plant rows or furrows and it is desirable that the wheels be maintained substantially centered with respect to the bottom of the valley and the present invention relates to a harvesting machine wherein the ground wheels traverse the furrows or valleys and the purpose of the invention is to maintain the wheels against rolling upwardly upon the inclined sides of the furrows. The structure to be hereinafter described is applicable to numerous types of agricultural machines.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 2:
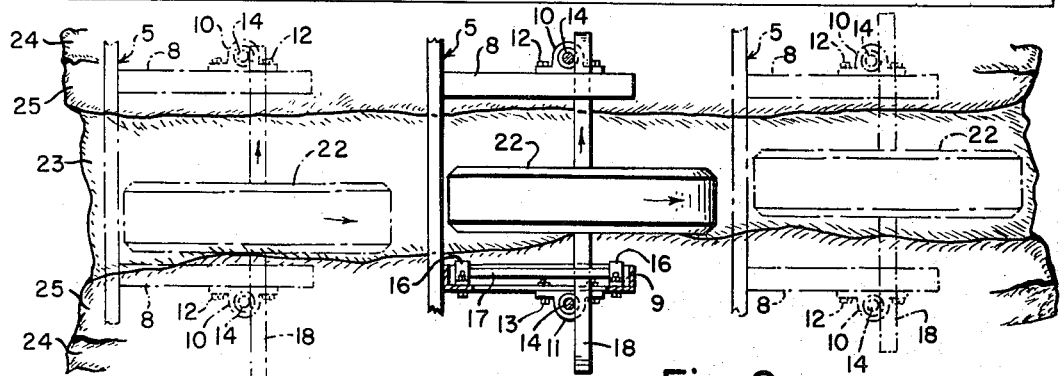
Figure 3:
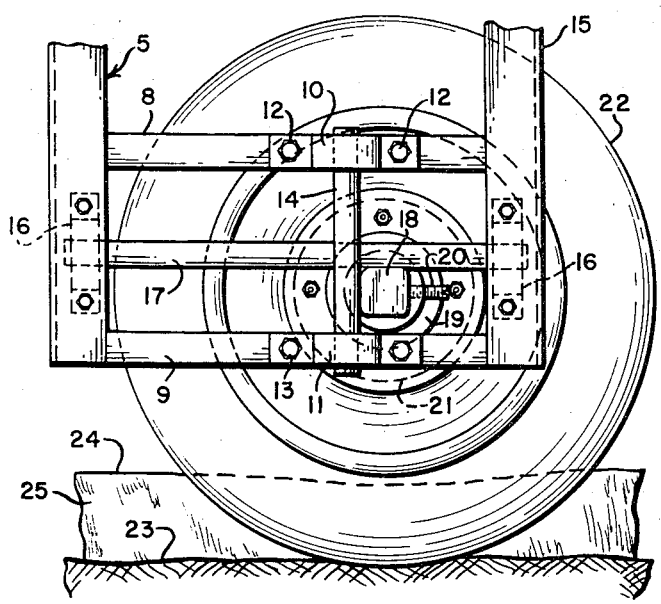

In the drawings:

FIGURE 1 is a front elevational view of a harvesting machine having a pair of ground wheels that traverse space apart plant rows and with one wheel and associated mechanism being illustrated in full lines while the other wheel has been broken away to illustrate structural features, FIGURE 2 is a plane view of a wheel mount illustrating the movements of the wheel with respect to the machine, taken substantially on line 2—2 of FIGURE 1, and FIGURE 3 is a view taken substantially on line 3—3 of FIGURE 1 looking in the direction of the arrows.

Referring specifically to the drawings, there has been illustrated an agricultural machine basically, such as that shown at 5 in FIGURE 1 and embodying frame members 6 and 7 and with the frame members 6 and 7 carrying horizontally arranged frame members 8 and 9 that project forwardly and are tied or anchored to the trailing parts of the machines that are not critical to this invention. Each of the frame members 8 and 9 upon their outer sides carry fixed bearings 10 and 11, fixed thereto by bolts 12 and 13 and with the bearings 10 and 11 carrying a rotatable vertically arranged shaft 14, journaled in the bearings 10 and 11. The frame members 8 and 9 are connected at their forward ends by rigid frame members 15 and with the frame member subsequently connected to a rigid frame member of the machine illustrated at 5.

As also indicated as being mounted upon the frame members 5 and 15 and disposd in bearings 16, carried by frame members 5 and 15, is a rotatable bar 17, horizontally disposed and parallel with the frame members 8 and 9.

Extending between the frame members 8 and 9 and underlying the bar 17, is a preferably square shaft 18, that also overrides the rotatable and vertically arranged shafts 14 and projecting beyond the shafts 14.

Fixed upon the square shaft 18, is a cylindrical bearing 19, held against sliding movement with respect to the shaft 18 by set pin 20. The bearing 19 carries a disk 21 upon which is mounted a rubber tired wheel 22. The wheel 22 constitutes a ground wheel for rolling engagement into the bottom of a furrow 23 of a plant row 24, having inclined sides 25.

In the normal use of the device, the machine 5 is adapted to have its wheels 22 engaging within a multiplicity of plant rows, such as illustrated in FIGURE 1 and the machine is propelled over the field, being supported by the wheels 22 and additional wheels, not shown and so that the machine is guided through the plant rows to cause the wheels to traverse the bottom of the furrow 23. The wheels 22 and the shaft 18 are floatingly mounted between the frame members 8 and 9 and, when the wheels become disaligned from the center of the plant row, the wheel normally tends to ride upon the inclined side of the plant beds or furrows and this action causes the wheels to shift with respect to the frame so as to always maintain the wheels substantially centered with respect to the furrow and to cause the machine to override the furrows for harvesting the crop, such as cucumbers. The shaft 18 is thus slidable back and forth under the movement of the wheel 22 and is held in a downward position by the shaft 17 and held against rearward movement by the vertical shafts 14, always maintaining the wheels centered with respect to the furrow and to effectively guide the machine over the field for the harvesting of the particular crop. The wheels 22 thus, never roll upon the furrows and provide a very effective guiding mechanism for the machine during the harvesting operation.

It will be apparent from the foregoing that there has been provided a very novel means for the mounting of wheels upon harvesting machines that normally span a multiplicity of plant rows of furrows and to maintain the harvesting machine in a correct line of movement to prevent the wheels from overriding the crops. The structure is simple, strong, cheap to manufacture and most effective in use.

It is to be understood that the invention is not limited to the precise construction shown, but that changes are contemplated as readily fall within the spirit of the invention as shall be determined by the scope of the subjoined claims.

We claim:

1. In an agricultural machine of the character described that comprises a main frame, the frame at the forward end of the machine having forwardly extending and horizontally arranged frame members that are spaced apart, a shaft extending through each of the auxiliary frame members and with the shaft rotatably carrying a ground wheel at each side of the machine and bearing means for the shaft that permits the shaft and its wheel to slide in a horizontal plane to automatically adjust the wheels through the bottoms of the valleys of the plant rows, the wheels and the associated mechanism being carried by the leading end of the machine as it is propelled through a field.

2. The structure according to claim 1 wherein the auxiliary frame members are in upper and lower pairs and spaced apart and with the frame members being angle irons, each pair of auxiliary frame members being provided upon their outer sides with bearings, a shaft rotatable in each pair of bearings constituting an antifriction abutment against which the shaft operates and a horizontal rotatable shaft that is fixed in bearings and that bears upon the top of the shaft whereby to limit the upward movement of the shaft and also to constitute antifriction means for the sliding of the shaft.

3. The structure according to claim 1 wherein a main frame of the machine at each side is provided with fixed vertically arranged frame members and with each frame member being provided with a pair of forwardly extending and horizontally arranged spaced apart auxiliary frame members, the auxiliary frame members being connected together by a frame member of the main frame, the auxiliary frame members upon their outer sides being provided with a pair of aligned bearings for rotatably carrying a vertical shaft that spans the distance between the auxiliary frame members, the main frame members carrying journal bearings for rotatably receiving a shaft that extends horizontally, a preferably square shaft that is floatingly mounted in the auxiliary frame members and that engages the vertical shafts at each side of the auxiliary frame members for limiting the rearward movement of the shaft during the traverse of the machine and with the shaft also engaging the horizontal rotatable shafts to limit the upward movement of the square shaft, a bearing fixed upon the square shaft intermediate its ends and a ground wheel rotatable upon the last named bearing to support the machine in its traverse through the field, the square shaft at each forward side of the machine and its associated bearings being spaced apart with respect to each other to fit within spaced apart valleys of multiple plant rows, the valleys being between spaced apart furrows and with the furrows having inclined sides to the valleys.

4. In an agricultural machine of the character described that comprises a main frame having a pair of widely spaced apart ground wheels at its forward side, the ground wheels being spaced apart to engage within the valleys between spaced apart plant rows, shafts for the wheels that are floatingly mounted within frame members fixed to the main frame and whereby the wheels are automatically shiftable from side to side when they engage the inclined sides of a plant row to dispose the wheels in the bottom of the valley and antifriction means carried by the frame members to permit the shafts and the wheels to move back and forth and also to be maintained in a horizontal alignment with respect to the frame members, the wheels being rotatable upon bearings carried by the shaft members and with the shafts being nonrotatable.

References Cited
UNITED STATES PATENTS

| | | | |
|---|---|---|---|
| 1,011,001 | 12/1911 | Wright | 172—26 |
| 1,650,746 | 11/1927 | Stubbs | 94—50 |
| 1,857,484 | 5/1932 | Stroburg et al. | 172—507 X |
| 2,788,220 | 4/1959 | Christensen | 280—47.16 |
| 3,194,575 | 7/1965 | Cullifer | 280—32.5 |

KENNETH H. BETTS, *Primary Examiner.*